Nov. 21, 1961     R. W. SCHIER ET AL     3,009,599
SERVING DISH FOR CITRUS FRUITS
Filed May 25, 1959
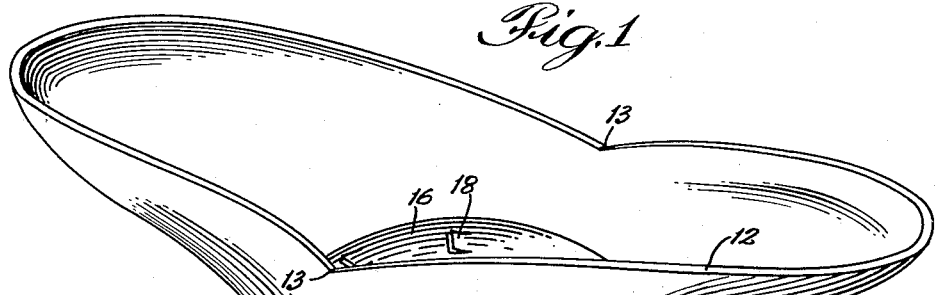
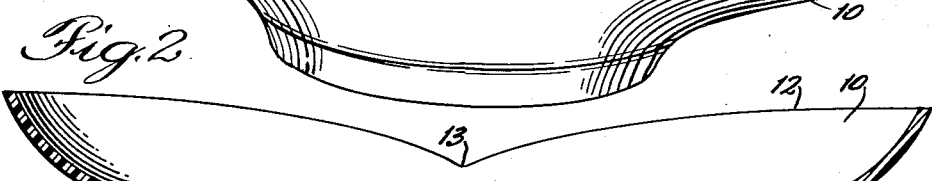
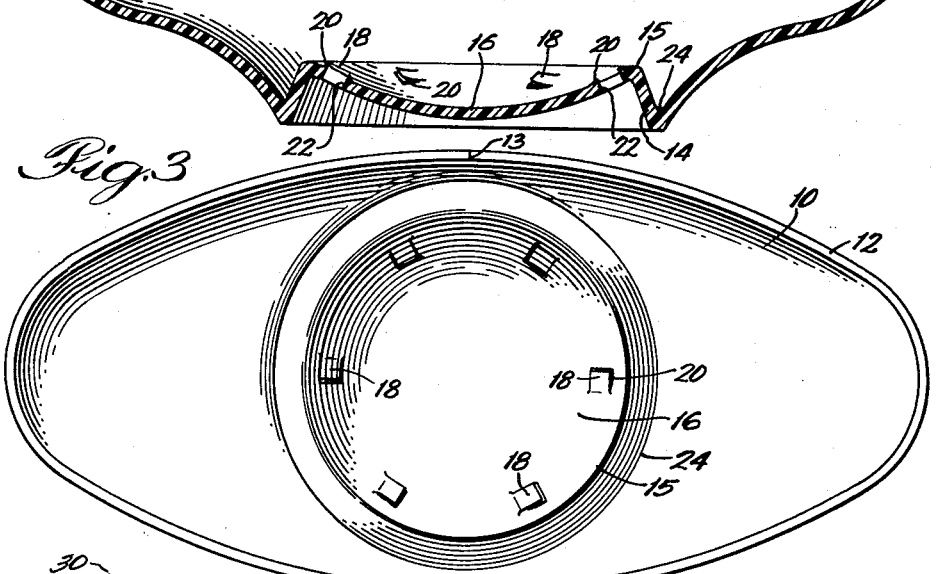
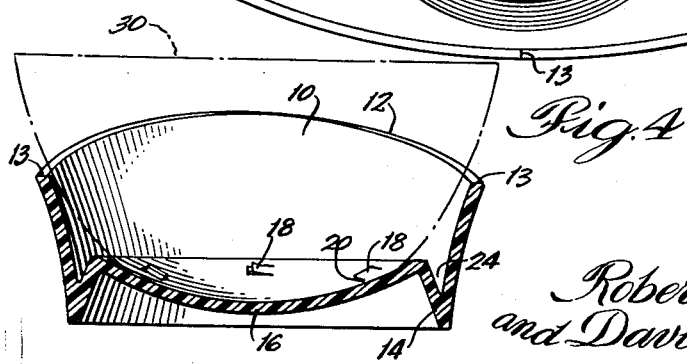
INVENTORS:
Robert W. Schier
and David H. Humphrey,
BY Bair, Freeman & Molinare
ATTORNEYS.

United States Patent Office 3,009,599
Patented Nov. 21, 1961

3,009,599
SERVING DISH FOR CITRUS FRUITS
Robert W. Schier, Northbrook, Ill., and David H. Humphrey, San Juan, Puerto Rico, assignors to Design Dynamics, Inc., Chicago, Ill., a corporation of Illinois
Filed May 25, 1959, Ser. No. 815,341
4 Claims. (Cl. 220—1)

This invention relates to a serving vessel for round or spherical fruit, primarily citrus fruits such as grapefruit and oranges, although it will find use in serving melons or other fruit which is spooned from the rind. Such fruits are awkward to handle at the table because the meat must be severed from the rind and the membrane, if any, by the spoon and this necessitates grasping the fruit securely with one hand to keep it on the dish. Furthermore, citrus fruits exude juice which covers the skin and drains to the bottom of the dish to make the task even more difficult.

The primary object of this invention is to provide a serving vessel for fruit of this type having means for securing the fruit to the bottom of the vessel.

Another object is to provide a serving vessel comprising a dish having a pad or platform formed in the bottom thereof and projecting upwardly into the dish whereby the fruit may be supported out of contact with juice in the dish.

In a preferred form the vessel of the invention comprises an elongated dish having a central, ring-like base and a concave supporting pad formed within the ring to which the fruit may be anchored. The height of the sides of the dish adjacent the pad and the height of the pad are so interrelated that large diameter fruit which normally extends beyond the sides of the dish when placed on the pad will clear the rim. By reason of this relationship juice from the fruit will not run down the outside of the dish as it would if the fruit rested on the rim.

Another object is to provide these desired functional advantages in a vessel which has an aesthentically pleasing appearance and which may be molded economically from plastics.

These and other objects and advantages of the invention will become apparent from the following description when read in connection with the accompanying drawing, wherein:

FIGURE 1 is a perspective view of a serving vessel constructed in accordance with this invention;

FIGURE 2 is a longitudinal sectional view through the vessel shown in FIGURE 1;

FIGURE 3 is a plan view of the vessel shown in FIGURE 1; and

FIGURE 4 is a transverse sectional view taken at the center of the vessel and showing a large grapefruit, outlined in dot and dash lines, seated on the pad.

The vessel of the invention may be formed from metal or molded from plastics or ceramics. It comprises a dish, roughly elliptical in plan view, with side walls 10 which flare outwardly and upwardly in a double curvature from a central, ring-like base 14. The side walls 10 (symmetrical with respect to the longitudinal center line of the dish) terminate in a rim 12 which slopes gradually downward from the ends of the vessel to the middle to form a shallow V 13 on either side, having its apex opposite the center of the ring-like base 14. In addition to providing a pleasing appearance, this configuration of the rim has an important function which will appear hereinafter.

The dish bottom comprising a depressed area within the base ring 14 is curved concavely from the upper edge 15 of ring 14 and constitutes a pad or support 16 for the fruit. The pad projects upwardly into the dish, thus forming a circumferential groove 24 with side wall 10 into which juice from the fruit may collect. The concave curvature of the pad 16 is preferably spherical to conform to the curvature of the fruit. To secure the fruit to the supporting pad we have provided skin-penetrating hook-like prongs 18 which take the form of tongues punched out of the pad. If desired, the prongs may be pointed, but we have found that if the metal from which they are formed is not too thick, they will penetrate the rind without difficulty. The open ends of the prongs all face in one direction and are circumferentially spaced within the top edge 15 of the ring 14. By inclining the prongs laterally as well as upwardly the fruit is secured in two directions. Although one row of prongs has been illustrated in the drawing, it will be understood that more than one row may be used and the prongs need not necessarily be in alignment on a circle. When the prongs are formed by punching through the metal pad 16, a burr is formed on the inside surface of the pad which takes the form of a ridge 20. This ridge, extending around the three marginal edges of the opening 22, prevents the juice from running through the opening.

We have found from extensive surveys that the diameter of the pad 16 upon which the fruit rests may range from 2⅛ to 2⅜ inches. This size conveniently accommodates oranges and grapefruit of varying size. In using the vessel, the grapefruit or other fruit is seated on the pad and is turned in a clockwise direction against the open prongs 18 while applying vertical pressure. The prongs penetrate and embed themselves in the rind of the fruit and securely anchor it to the pad. The height of the prongs 18 above the surface of pad 16 must be limited so that the prongs do not penetrate completely through the rind in which case juice would escape through the opening cut by the prongs.

The portion of rim 12 on either side of the pad 16 is located at such a distance above the pad that a large piece of fruit which extends beyond the wall 10 will not rest on the rim. For this reason the rim slopes downwardly to form a V at 13. If the rim 12 is not sloped in this manner, the projection of the pad upwardly into the dish will have to be raised sufficiently to clear it, and this adversely affects the stability of the vessel as well as its appearance. We prefer to raise the pad sufficiently so that the bottom of the concave curvature clears the surface on which the vessel rests, and to adjust the height of the rim in the manner indicated. This results in a very pleasing appearance. In FIGURE 4 we have shown, in dot and dash lines, the outline of a grapefruit which projects beyond the side wall of the dish and would normally rest on the rim if the rim were not curved downwardly in the manner indicated.

It will be noted that the ends of the dish are curved and narrowed. This shape provides convenient pouring spouts at either end for juice that might collect in the groove 24 in the bottom of the dish. The ends also serve well as handles for holding the dish.

Where the dish is molded from plastic resinous material, the prongs 18 may be integrally molded therewith or struck out of a piece of sheet metal molded in the pad 16. If the dish is formed from ceramic material, the prongs may be embedded in the material before firing. Other modifications in the construction of the vessel of the invention will occur to those skilled in the art. It is, therefore, our intention to include as our invention modifications not shown or described herein which may reasonably be included within the scope of the appended claims.

What we claim is:

1. A serving vessel for citrus fruit comprising a shallow dish having outwardly-flaring side walls and a central concave pad in the bottom thereof for supporting the fruit in the dish, a flange extending downwardly from the upper edge of said pad, said flange being joined at its base by the lower ends of said outwardly flaring side walls to form a shallow groove around the pad, and means mounted on the pad for securing the fruit thereto.

2. The serving vessel of claim 1 in which said side walls terminate in rounded ends and slope downwardly from the ends toward the middle to form a shallow V on each side, the apex of the V being opposite the center of said pad.

3. The serving vessel of claim 1 in which said securing means constitutes skin penetrating hook-like prongs opening laterally in the same direction to permit rotating the fruit on the pad to cause the prongs to penetrate the skin, the prongs projecting above the pad a sufficient distance to become embedded in the skin without penetrating completely through the skin.

4. The serving vessel of claim 1 wherein said pad has a diameter of from 2⅛ to 2⅜ inches.

References Cited in the file of this patent
UNITED STATES PATENTS

| | | |
|---|---|---|
| D. 180,329 | Highberger | May 21, 1957 |
| 511,323 | Blasi | Dec. 26, 1893 |
| 1,858,247 | Milliron et al. | May 17, 1932 |
| 2,552,474 | Amberg | May 8, 1951 |
| 2,867,940 | Hon | Jan. 13, 1959 |